United States Patent [19]

Dearman

[11] Patent Number: 4,712,779
[45] Date of Patent: Dec. 15, 1987

[54] WELDING FIXTURE

[76] Inventor: Timothy C. Dearman, P.O. Box 937, Pearland, Tex. 77581

[21] Appl. No.: 326,485

[22] Filed: Dec. 2, 1981

[51] Int. Cl.⁴ .............................................. B25B 1/20
[52] U.S. Cl. ..................................................... 269/43
[58] Field of Search ...................... 269/37, 41, 43, 45, 269/246, 152, 155, 60; 29/271, 281.1, 281.5, 281.6, 281.4; 228/49 R, 49 A, 49 C

[56] References Cited

U.S. PATENT DOCUMENTS

| | | | |
|---|---|---|---|
| 143,604 | 10/1873 | Ainsworth | 269/45 X |
| 842,007 | 1/1907 | Parker | 269/45 |
| 1,125,253 | 1/1915 | Barber | 269/45 X |
| 1,389,760 | 9/1921 | Humbert | 269/246 |
| 1,942,463 | 1/1934 | Williams | 269/43 X |
| 2,803,209 | 8/1957 | McDaniel | 269/43 X |
| 4,165,869 | 8/1979 | Williams | 269/41 |

Primary Examiner—Robert C. Watson
Attorney, Agent, or Firm—Learman & McCulloch

[57] ABSTRACT

A welding fixture for use in aligning and holding plate-like members for welding comprises a first clamp unit having a cavity for the accommodation of one plate and provided with anchor screws operable to secure the clamp unit to the plate. The apparatus also includes a support unit that is carried by the first clamp unit and has a chamber therein for the accommodation of a second clamp member capable of receiving a second plate that is to be welded to the first plate. The second clamp unit has anchor screws for clamping the second clamp unit to the second plate. The support member is adjustable horizontally relative to the first clamp unit and the second clamp unit is adjustable vertically relative to the first clamp unit while such units are clamped to their respective plates so as to enable the two plates to be adjusted to and maintained in proper relative positions during welding.

12 Claims, 9 Drawing Figures

WELDING FIXTURE

BACKGROUND OF THE INVENTION

In the welding together of plate-like members in the fabrication of storage tanks, hulls, ship walls, and the like, it is common to weld an upstanding first plate along the bottom edge thereof to a frame member, following which a second upstanding plate is positioned on the frame member adjacent the first plate and welded to the frame along the bottom edge and to the first plate along their confronting vertical edges. The lower course of the structure being fabricated is completed by welding successive plates onto the frame member and to the previously welded plates. If the object being fabricated has more than one course of plates, the plates of the second course are welded along their bottom edges to the top edges of the plates of the first course and the confronting vertical edges of the plates of the second course are welded to one another.

In the welding of successive plates to one another it is necessary to locate and maintain the plates in such relative positions as to provide a proper weld. This requires that the confronting vertical edges of two plates be in coplanar relation and spaced apart the proper distance. This usually necessitates the use of clamping devices. In addition, it is quite common for temporary lugs, bars, and straps to be welded to one or both plates prior to the welding of the latter together for the purpose of maintaining them in the desired relative positions. The use of such temporary devices is objectionable for a number of reasons, not the least of which is the time required to apply and subsequently remove them. In addition, the welding of the temporary devices to the plates sometimes adversely affects the temper of such plates or causes them to warp.

Devices of the kind heretofore proposed for use in the welding of plates to one another have been confined, so far as is known, to devices which are capable of positioning two plates of the same course, but are not capable of being used to position and support plates of two adjacent vertical courses.

Apparatus constructed in accordance with the invention overcomes the disadvantages of heretofore known apparatus intended for similar purposes.

SUMMARY OF THE INVENTION

A preferred embodiment of the invention comprises a base or first unit having spaced apart walls forming a cavity for the accommodation of a first plate-like member. The base unit preferably has rollers adapted to bear against one edge of the plate to enable the base unit to be rolled along the plate to a predetermined position. The base unit also includes clamps which bear against the plate to clamp the base unit to the plate.

Fitted to the base unit is a support or mounting unit which provides support for a second clamp member that may be clamped to a second plate which is to be welded to the first plate The base unit and the mounting unit are adjustable relative to one another by a screw threaded adjusting device and the second clamp unit and the mounting unit are adjustable relative to one another by a threaded adjusting device. The relatively adjustable units may be adjusted following their being clamped to their respective plate members so as to effect relative movement of such plates to positions in which they may be welded to each other.

DESCRIPTION OF THE DRAWINGS

The presently preferred embodiment of the invention is disclosed in the accompanying drawing wherein.

THE PREFERRED EMBODIMENT

Figure 1:
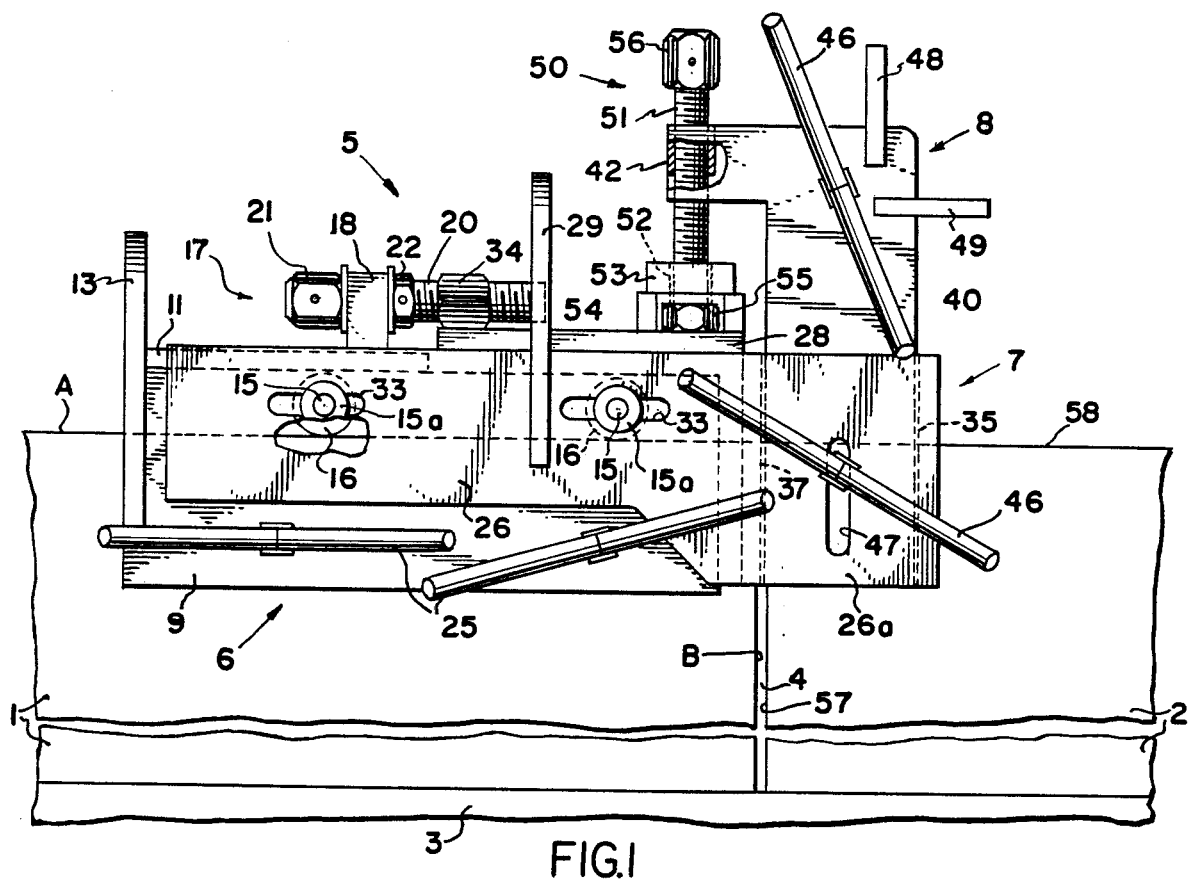
FIG. 1 is a side elevational view, partly in section, of the apparatus applied to a pair of plates that are to be welded together.
Figure 2:
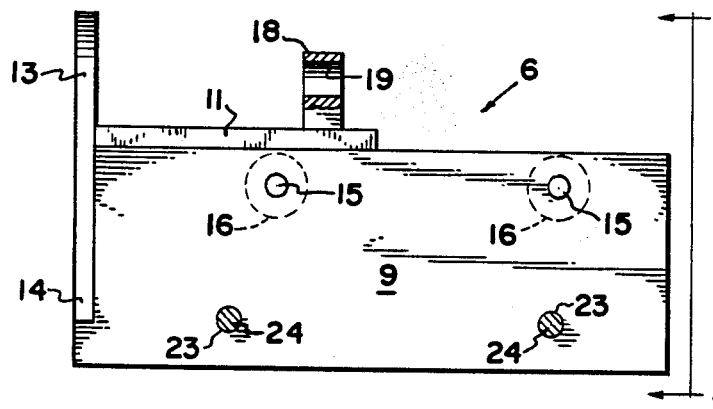
FIG. 2 is a view partly in side elevation and partly in section of the base clamp member.
Figure 4:
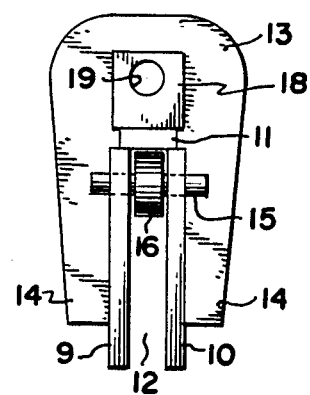
FIG. 4 is an end elevational view of the base clamp member as viewed in the direction of the arrows 4—4 of FIG. 2.
Figure 3:
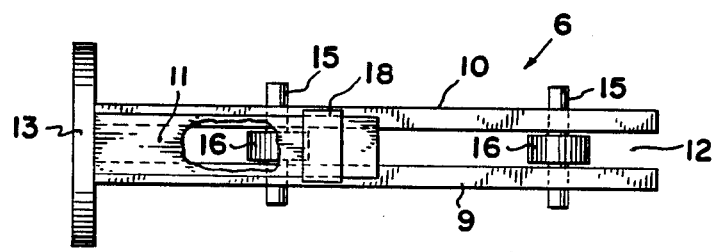
FIG. 3 is a top plan view, with a part broken away, of the base clamp member.

Apparatus constructed in accordance with the invention is illustrated in FIG. 1 as being used in conjunction with a pair of upright, metal plate members 1 and 2 of which the member 1 is welded to a suitable base 3 and the member 2 is supported on the base and spaced from the plate 1 by a suitable gap 4 in position to be welded to the plate 1 and to the base 3.

The welding fixture according to the invention is designated generally by the reference character 5 and comprises three major parts: a base clamp unit 6, a support unit 7, and a second clamp unit 8.

The base clamp unit 6 has a pair of spaced, parallel plates 9 and 10 joined at their upper ends by a web 11, the spacing between the plates forming a cavity 12 of such width as freely to accommodate therein either of the plates 1 and 2. At one end of the base unit is an upstanding reinforcing member 13 having legs 14 which straddle the plates 9 and 10 and are welded thereto.

The plates 9 and 10 are bored for the accommodation of transverse shafts 15 on each of which is journalled a roller 16 located between the plates 9 and 10. Each shaft 15 extends transversely beyond both of the plates 9 and 10 for a purpose presently to be explained.

Mounted atop the web 11 is an adjusting device 17 having an upstanding block 18 through which extends a bore 19. A threaded adjusting screw 20 extends freely through the bore 19 and has a head 21 fixed at one end thereof that bears against one side of the block 18. Also fixed to the screw is a collar 22 that bears against the opposite side of the block. The screw is rotatable relative to the block 18, but is axially fixed with respect thereto.

The base clamp unit 6 has a pair of threaded openings 23 in at least one of its walls for the accommodation of correspondingly threaded anchor screws 24 having operating arms 25. The anchor screws are extendable into the cavity 12 to engage a plate therein and secure the base clamp unit tightly to the plate. In its secured position the base clamp unit 6 rests on the upper edge A of the plate 1 and adjacent its free vertical edge B.

Figure 5:
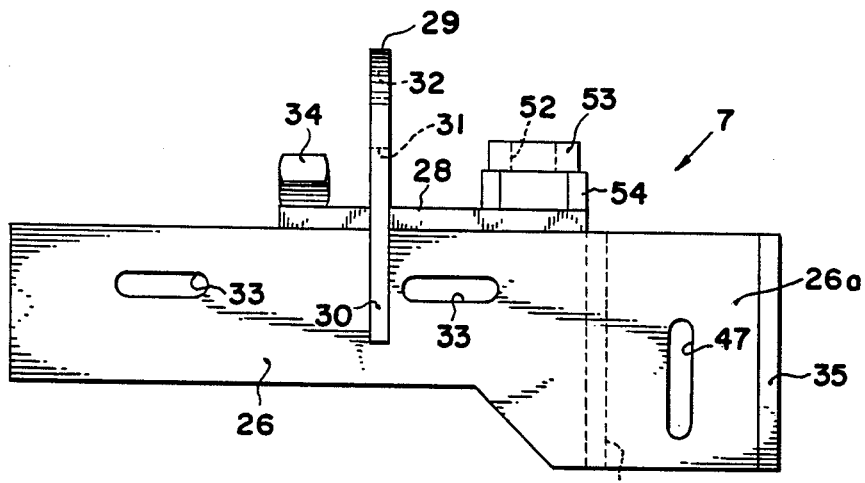
FIG. 5 is a side elevational view of the support unit.
Figures 6, 7:
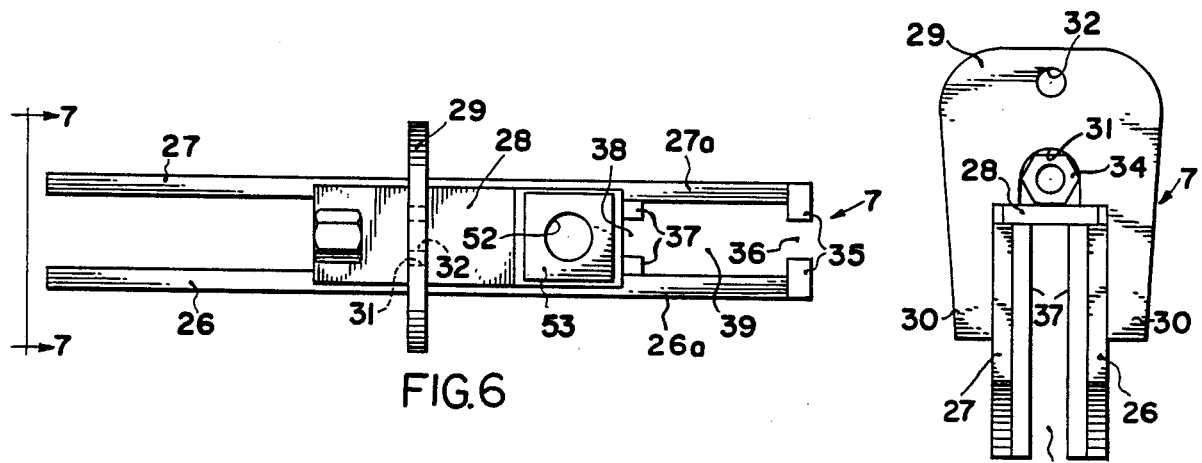
FIG. 6 is a top plan view of the support unit.
FIG. 7 is an end elevational view of the support unit as viewed in the direction of the arrows 7—7 of FIG. 6.
Figures 8, 9:
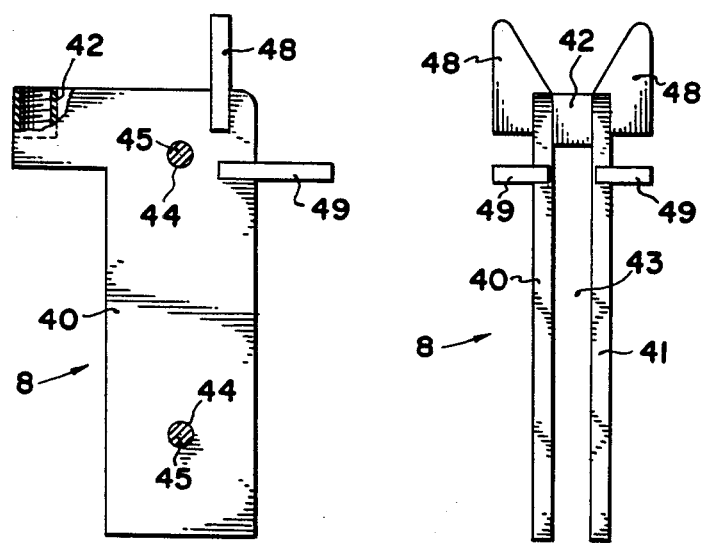
FIG. 8 is a side elevational view, partly in section, of a second clamp unit.
FIG. 9 is a front elevational view of the second clamp unit.

The mounting or support unit 7 (FIGS. 5-7) is saddle-shaped, having a pair of parallel, spaced apart plates 26 and 27 joined at their upper edges by a web 28 and reinforced by a brace 29 having spaced apart legs 30 which are welded to and flank the plates 26 and 27. The brace 29 also has an opening 31 adjacent the web 28 and another opening 32 therein at a higher level. The purposes of the openings 31 and 32 will be explained.

The spacing between the legs 26 and 27 of the support unit 7 is sufficient to enable the latter to straddle the base unit 6 with the latter snugly, but slideably, accommodated between the plates 26 and 27. The plates 26 and are provided with elongate slots 33 through which the shafts 15 extend. Annular retainers 15a are fixed to the free ends of the shafts outboard of the plates 26 and 27. The arrangement is such that the support unit 7 is movable relatively to the base unit 6 back and forth in a horizontal plane for a limited distance as determined by the length of the elongate slots 33.

The web 28 of the support unit 7 has fixed thereto an internally threaded nut 34 which receives the adjusting screw 20 that is carried by the base unit 6. The nut 34 is aligned with the opening 31 in the brace 29 so as to enable the shank of the screw 20 to pass through the opening 31. The arrangement is such that rotation of the screw 20 in one direction will effect relative horizontal adjustment of the units 6 and 7 in one direction and rotation of the screw 20 in the opposite direction will effect relative adjustment of the units 6 and 7 in the opposite direction.

The plates 26, 27 of support unit 7 have extensions 26a and 27a, respectively, which project beyond one end of the base unit 6, as is best shown in FIG. 1. At the free ends of the extensions 26a, 27a are blocks 35 having a space 36 therebetween, and inwardly of the free ends of the plates 26a, 27a, and confronting one another, are spaced apart blocks 37 separated by a space 38 having a width corresponding to that of the space 36. The arrangement is such as to form a chamber 39 open at its top and bottom and at one side.

The second clamp member 8 comprises a pair of L-shaped members 40 and 41 spaced apart by an internally threaded sleeve 42, the spacing between the plates 40 and 41 forming a recess 43 the width of which corresponds to the width of the spaces 36 and 38. The clamp unit 8 is adapted to be fitted slideably into the chamber 39 at the forward end of the unit 7 with the plate 40 adjacent the extension 26a and between the members 35 and 37 and the plate 41 adjacent the extension 27a and between the adjacent members 35 and 37. The unit 8 thus is vertically adjustable relative to the unit 7.

At least one plate 40, 41 of the unit 8 has a pair of threaded openings 44 therein and in each of which is a correspondingly threaded clamp screw 45 having a handle 46. One of the clamp screws 46 extends through an elongate, vertical slot 47 formed in one or both of the extensions 26a, 27a.

Two pairs of guides 48 and 49 are carried by the clamp unit 8 adjacent the upper ends of the plates 40, 41 to facilitate the fitting of a plate member into the recess 43, as will be explained in more detail hereinafter.

Adjusting means 50 (FIG. 1) is provided for effecting vertical adjustment of the clamp member 8 relative to the unit 7 and comprises a threaded shaft 51 which extends through the correspondingly threaded sleeve 42 and through a smooth bore 52 (FIG. 6) formed in a block 53 that is fixed to and supported on a cage 54 which is welded to the web 28 of the unit 7. Freely rotatable within the cage 54 is a head 55 that is fixed to the shaft 51 so as to rotate with the latter. At the opposite end of the screw 51 is fixed a head 56 by means of which the screw 51 may be rotated. Rotation of the screw 51 in one direction will effect vertical movement in one direction of the clamp unit 8 relative to the unit 7, whereas rotation of the screw 51 in the opposite direction will effect movement of the clamp unit 8 relative to the unit 7 in the opposite direction.

In describing the operation of the apparatus it will be assumed that the plate 1 is welded to the base 3 and that the plate 2 has a bottom edge that is to be welded to the base 3 and a vertical edge 57 that is to be welded to the edge B of the plate 1.

The welding fixture 5 may be suspended from a hoist (not shown) by fitting a hook (not shown) through the opening 32 in the brace 29 and lowering the fixture so that the plate 1 is accommodated within the cavity 12 with the rollers 16 engaging the upper edge A and with the plate extending beyond the opposite ends of the cavity. At this time the hook may be removed from the opening 32 and the hoist used for other purposes.

The welding fixture 5 may be rolled along the upper edge 26 of the plate 1 until the base clamp unit 6 is adjacent the vertical edge B, whereupon the anchor screws 24 may be turned tightly against the plate 1, thereby removably clamping the unit 6 to the plate. The plate 2 then may be moved, either manually or with a hoist (not shown), into the recess 43 of the clamp unit 8 so as to locate its bottom edge on the base 3 and its vertical edge 57 adjacent the vertical edge B of the plate 1. The lower anchor screw 45 then may be turned tightly against the plate 2 so as to clamp the unit 8 securely against the plate 2 with the latter extending beyond the opposite ends of the recess 43.

Following clamping of the clamp unit 8 to the plate 2, the adjusting device 17 may be manipulated so as to effect relative movement between the base clamp unit 6 and the second clamp unit 8 for the purpose of establishing between the confronting edges B and 57 of the respective plates 1 and 2 a gap 4 of suitable size. Thereafter, the adjusting means 50 may be manipulated to effect relative vertical adjustment of the units 6 and 8 so as to locate the upper edge 58 of the plate 2 at the same level as that of the upper edge A of the plate 1. Shims, not shown, may be used, if desired, to provide a gap between the plate 2 and the base 3. The plate 2 then may be welded to the base 3 and to the plate 1.

Additional plates may be welded to the plates 1 and 2, and at the same level as the latter. If the plates are curved, they will form a closed loop; if they are planar, they will form an elongate wall.

When a second, higher course of plates is to be welded to the lower course represented by the plates 1 and 2, the fixture 5 will be rolled along the upper edge of the plates forming the lower course until the fixture is in a desired location, whereupon the clamp unit 6 may be clamped to a lower course plate by the anchor screws 24.

A hoist (not shown) may lift another plate which may be guided by the guides 48, 49 into the recess 43 of the clamp unit 8, but in this case the lower edge of such plate will lie above the upper edge 58 of the lower course plate 2. The uppermost anchor screw 45 then may be turned tightly against the upper course plate so as to clamp the unit 8 securely against such plate. Thereafter, the adjusting mechanisms 17 and 50 again may be manipulated so as to locate the confronting edges of the plates in the desired relative positions, following which the weld may be made. The above described procedures may be repeated until as many courses of plates have been welded together as may be desired.

The disclosed embodiment is representative of a presently preferred form of the invention, but is intended to be illustrative rather than definitive thereof. The invention is defined in the claims.

I claim:

1. Apparatus for use in relatively positioning a pair of plate-like members for welding, said apparatus comprising a first clamp unit for attachment to one of said members; first anchor means carried by said first clamp unit for securing the latter to said one of said members; a second clamp unit for attachment to the other of said members; second anchor means carried by said second clamp unit for securing the latter to the other of said members; means mounting one of said clamp units on the other of said clamp units for relative movement therebetween in each of two mutually normal planes; and adjusting means interconnecting said first and second clamp units and operable to effect relative movement therebetween in either of said planes while such units are secured to their respective members.

2. Apparatus according to claim 1 wherein said first clamp unit includes a pair of spaced, parallel walls between which said one of said members may be accommodated.

3. Apparatus according to claim 2 including roller means between said walls for rolling engagement with said one of said members.

4. Apparatus according to claim 1 wherein said adjusting means comprises a pair of independently operable devices.

5. Apparatus according to claim 1 wherein said mounting means comprises a support movably carried by said first clamp unit and supporting said second clamp unit.

6. Apparatus according to claim 5 wherein said adjusting means comprises a first device reacting between said support and said first clamp unit and a second device reacting between said support and said second clamp unit.

7. Apparatus for use in relatively positioning a pair of plate-like members for welding, said apparatus comprising a base clamp member having a pair of spaced apart walls defining a cavity for the accommodation of one of said members, said cavity being open at its opposite ends; means carried by said base clamp unit and spanning said cavity for supporting said base clamp unit on said one of said members for movements back and forth relative thereto and with said one of said members extending beyond the ends of said cavity; first anchor means for securing said base clamp unit in a selected position of adjustment relative to said one of said members; a support member having walls defining a chamber; means mounting said support member on said base clamp unit with the latter between said walls; a second clamp unit accommodated in said chamber for movements relative to said support member, said second clamp unit having a recess therein for the accommodation of the other of said pair of members, said recess being open at its opposite ends; second anchor means for securing said second clamp unit in a selected position of adjustment relative to said other of said members with the latter extending beyond the opposite ends of said recess; and adjustable means coupling each of said clamp units to said support member for adjusting said clamp units relative to one another and to said support member while said clamp units are secured to their respective members.

8. Apparatus for use in relatively positioning a pair of plate-like members for welding, said apparatus comprising a base clamp unit having a cavity within which one of said members may be accommodated; means carried by said base clamp unit for supporting the latter on said one of said members; first anchor means for securing said base clamp unit to said one of said member; a second clamp unit having a recess therein for the accommodation of the other of said members; second anchor means for securing said second clamp unit to the other of said members; a support unit mounting said second clamp unit on said base clamp unit; and adjustable means interconnecting each of said clamp units to said support unit and operable to adjust said clamp units relative to one another in each of two mutually normal planes while they are secured to their respective members, said adjustable means including a first device operable to effect relative movement of said base clamp unit and said support unit in either one of two opposite directions.

9. Apparatus according to claim 8 wherein said support unit is saddle-shaped and straddles said base clamp unit.

10. Apparatus according to claim 8 wherein said adjustable means comprises a second device operable to effect relative movement of said support unit and said second clamp unit in either one of two opposite directions.

11. Apparatus according to claim 8 including roller means carried by said base unit for rolling engagement with the member accommodated in said cavity.

12. Apparatus according to claim 8 wherein said adjustable means comprises cooperably threaded parts on the respective units in threaded engagement with each other.

* * * * *